United States Patent [19]

Pitchford

[11] 3,956,001

[45] May 11, 1976

[54] RETARDING SKIN FORMATION ON ASPHALT IN HOT STORAGE

[75] Inventor: Armin C. Pitchford, Bartlesville, Okla.

[73] Assignee: Phillips Petroleum Company, Bartlesville, Okla.

[22] Filed: Oct. 10, 1974

[21] Appl. No.: 513,826

[52] U.S. Cl. ............................ 106/273 R; 106/274
[51] Int. Cl.² ........................................ C08L 95/00
[58] Field of Search .............. 106/273 R, 278, 279, 106/274; 260/45.95 H; 427/138

[56] References Cited
UNITED STATES PATENTS

| | | | |
|---|---|---|---|
| 2,954,345 | 9/1960 | Filbey | 106/273 R |
| 3,265,661 | 8/1966 | Rocklin | 106/273 R |
| 3,513,005 | 5/1970 | Bradshaw et al. | 106/281 R |
| 3,539,370 | 11/1970 | Pitchford | 106/281 R |
| 3,808,020 | 4/1974 | Pitchford | 106/277 |

Primary Examiner—Lorenzo B. Hayes

[57] ABSTRACT

Surface hardening or skin formation on asphalts stored at temperatures in excess of 170°C is inhibited by the addition of (a) dodecylphenoxypoly(ethyleneoxy)ethanol; (b) calcium petroleum sulfonate; (c) 2,6-ditertiarybutyl-p-phenol; or (d) 2,6-ditertiarybutyl-p-phenol in combination with stearic acid.

12 Claims, No Drawings

RETARDING SKIN FORMATION ON ASPHALT IN HOT STORAGE

BACKGROUND OF THE INVENTION

This invention relates to asphalt compositions. In one of its aspects, this invention relates to inhibiting surface hardening of asphalt compositions. In another of its aspects, this invention relates to the incorporation into asphalt of additives that inhibit surface hardening under storage conditions.

In one of its concepts, this invention relates to inhibiting surface hardening of asphalts stored at elevated temperatures by incorporating inhibiting additives into the asphalt composition.

Asphalts derived from various crude oil sources frequently differ substantially in composition. These differences in composition influence the physical properties and the aging characteristics of the asphalt, particularly at storage conditions of high temperatures in excess of 170°C (338°F). Many asphalts surface harden to form a "skin" on the surface when storage at high temperatures is continued for several days. This insoluble skin results in a non-homogenous asphalt product which is not suitable for many of the common asphalt applications.

It is well known that surface hardening or skin formation of asphalt under storage conditions can be inhibited by: (1) maintaining an inert atmosphere above the asphalt during storage, (2) lowering the storage temperature to a maximum of 135°C (275°F) or (3) continuous agitation of the asphalt within the storage vessel. Sometimes it is not possible and quite often it is not practical to maintain the stored asphalt with agitation, at lowered temperature, or under a blanket of inert gas. It has been discovered that skin formation on asphalt stored at elevated temperatures can be inhibited by the addition of certain compounds or combinations of compounds to the stored, hot asphalt.

SUMMARY OF THE INVENTION

In accordance with this invention, asphalt compositions stored at temperatures in excess of 170°C are rendered more resistant to surface hardening or skin formation during storage by incorporation into the asphalt mixture of a stabilizing amount of compounds chosen from among calcium petroleum sulfonate, dodecylphenoxypoly(ethyleneoxy)ethanol, 2,6-ditertiarybutyl-p-phenol, and in combination 2,6-ditertiarybutyl-p-phenol and stearic acid. Substantial improvement in the time of initial formation of a skin on the surface of the stored asphalt results from the addition of these deterrent components to asphaltic base stocks. The inhibited compositions resulting from the incorporation of the stabilizing components into the asphalt mixture can be stored at elevated temperatures without the necessity of agitation or the maintaining of an inert atmosphere above the asphalt vessel.

Any calcium petroleum sulfonate can be employed as an inhibiting component for asphalt according to this invention. It is preferred, however, that the calcium petroleum sulfonates be the calcium salts with the sulfonic acids of aliphatic, aromatic, cycloaliphatic hydrocarbons and combinations thereof having from about 10 to about 100 carbon atoms. A presently preferred method for the production of the calcium sulfonates is disclosed in U.S. Pat. No. 3,135,693. Briefly, that process involves the sulfonation of a partially refined petroleum bright stock fraction in the presence of sulfur dioxide and sulfur trioxide to produce the corresponding sulfonic acids. The sulfonation is followed by the neutralization of those acids with calcium hydroxide. The calcium petroleum sulfonates can be recovered from the blend of calcium petroleum sulfonates and unreactive hydrocarbons which results from the partial sulfonation and neutralization.

The dodecylphenoxypoly(ethyleneoxy)ethanol, 2,6-ditertiarybutyl-p-phenol, and stearic acid which also have been found useful in accordance with this invention are well known chemical compounds which are readily available commercially.

The additive components can be added to any asphaltic mixture which is subject upon storage at elevated temperatures to surface harden thereby forming a thickened skin. Depending on the process of preparation of the asphaltic mixtures, this includes most asphaltic mixtures when stored at elevated temperatures over a period of several days.

The additive components of this invention have been found to be effective in a range of about 50 parts per million to about 10,000 parts per million based on the asphaltic mixture alone. Concentrations outside of this range are operable and can be used, but the range of additives cited above is effective for practical applications. Effective inhibition of the formation of surface skin can be obtained within the narrower range of about 50 to about 1,000 parts per million based on the asphalt mixture alone when economic considerations dictate the use of lesser amounts of the additives. When 2,6-ditertiarybutyl-p-phenyl is used in combination with stearic acid as an additive component the combination can have the ratio of 3:1 to 1:3 parts of stearic acid to 2,6-ditertiarybutyl-p-phenol, preferably a ratio of 1:1.

Further aspects and advantages of this invention are illustrated in the following examples which, it should be understood, are illustrative of preferred embodiments and should not be construed to unduly limit the invention.

EXAMPLE

Storage stability studies were carried out using asphalts prepared in the laboratory from Monagas pipeline crude oil obtained from 1971 and 1972 production samples containing a gas oil diluent for viscosity control. Composition and properties of thse crude oils are given in Table I. Each of the two crudes was distilled using a 15-plate Sarnia fractionation column. Asphalt was prepared by charging the 650 F+ topped crude from the Sarnia to a semicontinuous, isothermal vacuum flash unit to yield an asphaltic residue and a vacuum gas oil. Yields and properties of the vacuum asphalts derived from each of the two Monagas pipeline crudes are shown in Table II.

TABLE I

COMPOSITION AND PROPERTIES OF MONAGAS CRUDE OILS USED IN PREPARATION OF ASPHALTS FOR "SKIN FORMATION" TESTS

| Sample No. | 1 | 2 |
|---|---|---|
| Composition of Crude, Vol. % | | |
| Morichal Field (Lot 9) Group I Zone | 30.7 | 16 |
| Amoco Jobo Field, Group I Zone | 44.2 | 38 |
| Amoco Jobo Field, Group II Zone | | 26 |
| Morichal Field (Lot 9) Group II Zone | 23.7 | 16 |
| Gas Oil Diluent | 1.4 | 4 |
| Total | 100.0 | 100 |
| Properties of Crude | | |
| API Gravity at 60°F | 12.0 | 12.1 |
| Specific Gravity 60/60°F | 0.9861 | 0.9854 |
| BS & W, Vol. % | — | 0.7 |
| Water by distillation, Vol. % | 1.6 | — |
| Salt, lbs/1000 bbls | 1.0 | 0.0 |
| Pour Point, °F | +35 | +35 |
| Viscosity, SFS, 122°F | 543.3 | 609 |
| Sulfur, Wt. % | 2.19 | 2.87 |

TABLE II

PREPARATION AND PROPERTIES OF VACUUM ASPHALTS PREPARED FROM MONAGAS PIPELINE CRUDES FOR USE IN SKIN FORMATION TESTS

| Sample No. | 1 | 2 |
|---|---|---|
| Vacuum Flash Conditions | | |
| Pressure, mm Hg | 8.4 | 3.6 |
| Flash Temperature, °F | 500 | 500 |
| Corrected Temp. (760 mm)°F | 800 | 845 |
| Asphalt Yield | | |
| Vol. % of Crude | 66.5 | 66.4 |
| Wt. % of Crude | 69.3 | 69.2 |
| Asphalt Properties | | |
| API Gravity at 60°F | 6.6 | 6.2 |
| Viscosity, SFS | | |
| 275°F | 104.7 | 159.3 |
| 210°F | 846 | 1347 |
| Nitrogen, Wt. % | 0.68 | 0.72 |
| Sulfur, Wt. % | 3.28 | 3.50 |
| Penetration, 77°F | 161 | 97 |
| Softening Point, R&B, °F | 109 | 114 |
| Solubility, CCl$_4$, Wt. % | 99.93 | 99.85 |
| Asphaltenes (nC$_5$ Insols.) Wt. % | 21.86 | 21.42 |
| Oliensis Spot Test | Neg | Neg |
| Carbon Residue, Rams.,% | 16.23 | 16.50 |
| Ash, Wt. % | 0.09 | 0.10 |
| Thin Film Oven Test | | |
| Loss, Wt. % | 2.91 | 0.69 |
| Residue Pen., 77°F | 64 | 59 |
| % of Original Pen | 39.8 | 60.8 |
| Soft Point of Residue, R&B, °F | 122 | 125 |

Using a laboratory procedure to simulate plant storage conditions, oven aging tests were conducted with each of the asphalts. About 350 grams of asphalt were placed in a cylindrical one-pint paint can (8.5 cm ID × 10 cm high) and stored in a hot stagnant atmosphere at 174 C (345 F). Each sample was inspected at regular intervals until a "skin" was observed on the surface of the asphalt. Time required for the skin to form indicates the relative stability of each asphalt. Similar aging tests were made using various concentrations of Igepal RC-520 from GAF Corporation described as dodecyl-phenoxypoly (ethyleneoxy)ethanol having the formula;

Phil-Ad additive, an oil soluble calcium petroleum sulfonate from Phillips Petroleum Company; Ionol, 2,6-ditertiarybutyl-p-phenol; and a combination of Ionol with stearic acid. Results of these aging tests are reported in Tables III and IV.

TABLE III

EFFECT OF ADDITIVES ON THE FORMATION OF SKIN ON THE SURFACE OF MONAGAS ASPHALTS

| Asphalt Used | | 1 | | |
|---|---|---|---|---|
| Test No. | Control 1 | 1 | 2 | 3 |
| Additive Used, Wt. % | | | | |
| Ionol | — | 1.0 | 0.5 | — |
| Stearic Acid | — | — | 0.5 | — |
| Phil-Ad Additive | — | — | — | 1.0 |
| Skin Test | | | | |
| Temp., °F | 345 | 345 | 345 | 345 |
| Cumulative Wt. Loss, % at | | | | |
| 16 Hours | 2.0 | 2.4 | 1.9 | 1.9 |
| 20 | — | 2.6 | 2.1 | 2.1 |
| 22 | 2.2 | — | — | — |
| 24 | 2.9(a) | 2.8 | 2.3 | 2.3 |
| 28 | — | — | — | 2.4 |
| 32 | — | — | — | 2.5 |
| 40 | 3.0(b) | 3.6 | 3.3 | — |
| 48 | — | — | — | 2.8 |
| Time for Skin to Form, Hrs. | | | | |
| Initial Formation | 24 | 35 | 40 | 48 |
| Heavy Skin | 40 | 40 | —(c) | —(c) |
| Properties of Aged Asphalt | | | | |
| Penetration, 77°F | 80 | 84 | 92 | 79 |
| Softening Point, °F | 119 | 115 | 114 | 107 |
| Viscosity, SFS | | | | |
| 275°F | 193 | 171 | 160 | 195 |
| 210°F | 1790 | 1772 | 1647 | 1962 |
| Solubility, CCl$_4$, Wt. % | 99.76 | 99.80 | 99.8 | 99.8 |
| Asphaltenes, Wt. % | 25.1 | 23.6 | 24.3 | 24.4 |

(a)Slight skin beginning to firm.
(b)Heavy skin observed.
(c)Test terminated at more than 40 hours before "heavy" skin formed.

Time required for the formation of the insoluble skin was increased from 24 hours for the control to about 48 for the asphalt containing 1 percent calcium petroleum sulfonate. While the calcium petroleum sulfonate (Phil-Ad Additive) is not an antioxidant, skin formation is apparently inhibited by the presence of the detergent additive which disperses the oxidation at the air-asphalt interface in sufficient quantities to prevent formation of a skin on the asphalt during early stages of the test. It can also be seen that the 2,6-ditertiarybutyl-p-phenol, which is a known antioxidant, both alone and in combination with stearic acid was effective at concentrations of 1.0 weight percent. Since relatively high concentrations of an asphalt additive of any type would be prohibitive on an economic basis, skin tests were repeated using Ionol, alone, at concentrations ranging from 50 to 1,000 parts per million. Results of these tests which are recorded in Table IV below indicate that Ionol effectively inhibits skin formation on a Monogas asphalt at all concentration levels evaluated.

TABLE IV

| Asphalt Used | | | | 2 | | | | |
|---|---|---|---|---|---|---|---|---|
| Test Number | Control 2 | 1 | 2 | 3 | 4 | 5 | 6 | 7 |
| Igepal RC-520, Wt. % | — | 1.0 | 0.5 | 0.25 | 0.1 | — | — | — |
| Ionol Weight Percent | — | — | — | — | — | 0.1 | 0.01 | 0.005 |
| Skin Test Data | | | | | | | | |
| Temperature, °F | 345 | 345 | 345 | 345 | 345 | 345 | 345 | 345 |
| Cumulative Wt. Loss, % at | | | | | | | | |
| 16 Hours | 0.4 | — | — | — | — | — | — | — |
| 20 Hours | — | 0.42 | — | — | — | 0.8 | — | 0.6 |
| 22 Hours | 0.5 | — | 0.5 | 0.63 | 0.63 | — | 0.4 | — |
| 24 Hours | 0.6(a) | 0.49 | — | — | — | 0.8 | — | 0.7 |
| 27 Hours | — | 0.51 | — | — | — | 0.9 | 0.9 | 0.8 |
| 30 Hours | — | — | 0.7 | 0.77 | 0.86 | — | — | — |
| 40 Hours | 0.6(b) | — | — | — | — | — | — | — |
| 44 Hours | — | 0.71 | — | — | — | — | — | — |
| 46 Hours | — | — | 1.09 | 0.9 | 1.2 | 1.4(a) | — | 1.3 |
| 48 Hours | — | 0.83 | — | — | — | — | — | — |
| 50 Hours | — | — | 1.17(a) | 0.97(a) | 1.3(a) | — | 1.2(a) | 1.4(a) |
| 52 Hours | — | 0.86 | — | — | — | — | — | — |
| 54 Hours | — | — | 1.2 | 1.1 | 1.3 | — | — | — |
| 68 Hours | — | 1.09 | — | — | — | 1.7(b) | — | 1.6(b) |
| 72 Hours | — | 1.17 | 1.5(b) | 1.3(b) | 1.6(b) | — | 1.56(b) | — |
| 92 Hours | — | 1.54 | — | — | — | — | — | — |
| Time Required For Skin to Form, Hrs. | | | | | | | | |

TABLE IV-continued

| Asphalt Used<br>Test Number | Control 2 | 1 | 2 | 3 | 4 | 5 | 6 | 7 |
|---|---|---|---|---|---|---|---|---|
| Slight Skin Noted[2] | 22 | 92 | 50 | 50 | 50 | 48 | 52 | 52 |
| Heavy Skin Noted[b] | 40 | 92 | 72 | 72 | 72 | 68 | 72 | 68 |
| Properties of Aged Asphalt | | | | | | | | |
| Penetration, 77°F | 71 | 50 | 53 | 48 | 47 | 47 | 52 | 48 |
| Soft Point, R&B, °F | 120 | 125 | 125 | 128 | 129 | 126 | 127 | 126 |
| Viscosity, SFS | | | | | | | | |
| 275°F | 203 | 271.6 | 248.0 | 269.4 | 269.7 | 272.9 | 267.1 | 246.3 |
| 210°F | 2140 | 3145 | 3420 | 3420 | 3015 | 3425 | 3455 | 2935 |
| Solubility, CCl$_4$, Wt. % | 99.90 | 99.80 | 99.85 | 99.86 | 99.78 | 99.82 | 99.75 | 99.88 |
| Asphaltenes, nC$_5$ Insols, Wt. % | 22.8 | 25.9 | 25.0 | 26.1 | 25.4 | 26.6 | 26.0 | 26.1 |

Results of the test above show that skin formation is completely inhibited for more than 90 hours when 1 percent Igepal RC-520 is used as an additive for monogas asphalt. While the minimum effective concentration of Igepal was not conclusively established, 0.1 percent Igepal retarded skin formation on the monogas asphalt for more than 50 hours. Properties of the aged asphalts are also included in the tables. Based upon viscosity and penetration values the samples containing Igepal RC-520 appear to harden more than the control. However, these samples were exposed to the thermal treatment for longer periods of time before the skin appeared on the surface.

I claim:

1. A method for inhibiting surface hardening of asphalt under storage conditions of temperature in the range in excess of 170°C, said method consisting essentially of the incorporation into the asphalt mixture of a stabilizing amount of dodecylphenoxypoly(ethyleneoxy)ethanol having the formula

$C_{12}H_{25}$ —⟨ ⟩— $O(CH_2CH_2O)_5CH_2CH_2OH$ in the range of about 50 ppm to about 10,000 ppm.

2. A method for inhibiting surface hardening of asphalt under storage conditions of temperature in the range in excess of 170°C, said method consisting essentially of the incorporation into the asphalt mixture of a stabilizing amount of calcium petroleum sulfonate in the range of about 50 ppm to about 10,000 ppm.

3. The method for inhibiting surface hardening of asphalt under storage conditions of temperature in the range in excess of 170°C, said method consisting essentially of the incorporation into the asphalt mixture of a stabilizing amount of 2,6-ditertiarybutyl-p-phenol or 2,6-ditertiarybutyl-p-phenol in combination with stearic acid, said incorporated material in the range of about 50 ppm to about 10,000 ppm.

4. A method of claim 2 wherein the stabilizing amount of calcium petroleum sulfonate is in the range of about 50 to 1,000 ppm of the asphalt alone.

5. A method of claim 1 wherein the stabilizing amount is in the range of about 50 to about 1,000 ppm of the asphalt alone.

6. A method of claim 3 wherein the stabilizing amount is in the range of about 50 to about 1,000 ppm of the asphalt alone.

7. An asphalt composition inhibited from surface hardening under storage conditions of temperature in the range in excess of 170°C, said composition consisting essentially of said asphalt and a stabilizing amount of dodecylphenoxypoly(ethyleneoxy)ethanol in the range of 50 ppm to about 10,000 ppm of the asphalt alone.

8. An asphalt composition inhibited from surface hardening of asphalt under storage conditions of temperature in the range in excess of 170°C, said composition consisting essentially of said asphalt and a stabilizing amount of calcium petroleum sulfonate in the range of about 50 ppm to about 10,000 ppm of the asphalt alone.

9. An asphalt composition inhibited from surface hardening of asphalt under storage conditions of temperature in the range in excess of 170°C, said composition consisting essentially of said asphalt and a stabilizing amount of 2,6-ditertiarybutyl-p-phenol or 2,6-ditertiarybutyl-p-phenol in combination with stearic acid, said stabilizing amount in the range of 50 ppm to about 10,000 ppm of the asphalt alone.

10. An asphalt composition of claim 8 wherein the stabilizing amount is in the range of about 50 to about 1,000 ppm of the asphalt alone.

11. An asphalt composition of claim 7 wherein the stabilizing amount is in the range of about 50 to about 1,000 ppm of the asphalt alone.

12. An asphalt composition of claim 9 wherein the stabilizing amount is in the range of about 50 to about 1,000 ppm of the asphalt alone.

* * * * *